United States Patent
Dinan et al.

(10) Patent No.: US 8,031,665 B1
(45) Date of Patent: Oct. 4, 2011

(54) CONNECTION IDENTIFIER RESERVATION IN A WIRELESS COMMUNICATION SYSTEM

(75) Inventors: Esmail Hejazi Dinan, Herndon, VA (US); Jong-hak Jung, Herndon, VA (US); Swati Tiwari, Fairfax, VA (US); Hemanth Balaji Pawar, Herndon, VA (US); Krishna D. Sitaram, Chantilly, VA (US)

(73) Assignee: Clear Wireless LLC, Kirkland, WA (US)

( * ) Notice: Subject to any disclaimer, the term of this patent is extended or adjusted under 35 U.S.C. 154(b) by 513 days.

(21) Appl. No.: 12/211,272

(22) Filed: Sep. 16, 2008

(51) Int. Cl.
*H04W 4/00* (2009.01)
*H04L 12/28* (2006.01)

(52) U.S. Cl. ........................................ 370/329; 370/431

(58) Field of Classification Search .................. 370/252, 370/310, 328, 338, 395.2, 395.21, 431
See application file for complete search history.

(56) References Cited

U.S. PATENT DOCUMENTS

| | | | |
|---|---|---|---|
| 5,953,671 A * | 9/1999 | Childress | 455/512 |
| 6,452,915 B1 * | 9/2002 | Jorgensen | 370/338 |
| 6,804,521 B2 * | 10/2004 | Tong et al. | 455/450 |
| 2006/0276189 A1 | 12/2006 | Kiernan et al. | |
| 2007/0026861 A1 | 2/2007 | Kuhn et al. | |
| 2007/0211726 A1 * | 9/2007 | Kuang et al. | 370/395.3 |
| 2008/0069019 A1 * | 3/2008 | Fahldieck | 370/310 |
| 2008/0186889 A1 * | 8/2008 | Park et al. | 370/310 |
| 2009/0040983 A1 * | 2/2009 | Kim et al. | 370/331 |
| 2009/0097430 A1 * | 4/2009 | Park | 370/312 |
| 2009/0219850 A1 * | 9/2009 | Lin et al. | 370/312 |
| 2010/0142458 A1 * | 6/2010 | Mark | 370/329 |
| 2011/0044226 A1 * | 2/2011 | Song et al. | 370/312 |

* cited by examiner

*Primary Examiner* — Warner Wong
(74) *Attorney, Agent, or Firm* — O'Brien Jones PLLC

(57) ABSTRACT

A wireless communication system allocates connection identifiers into a first group and a second group. The system associates sectors or base stations with a reservation zone, and associates the reservation zone with the first group of connection identifiers. The system associates the first group of connection identifiers with a quality-of-service level. In response to determining that a user has the quality-of-service level, the system reserves at least one of the connection identifiers in the first group for the user and uses the reserved connection identifier to communicate with the first user in all of the sectors or base stations associated with the reservation zone.

20 Claims, 8 Drawing Sheets

CONNECTION IDENTIFIER RESERVATION IN A WIRELESS COMMUNICATION SYSTEM

TECHNICAL BACKGROUND

A mobile communication device and its serving base station wirelessly communicate to provide voice, Internet, email, text, video, and other communication services. As the mobile communication device moves about, the serving base station hands-off the mobile communication device to another target base station. After the hand-off, the target base station then becomes the serving base station, and subsequently, this new serving base station will hand-off the mobile communication device to another target base station.

In some wireless communication systems, the mobile communication device receives connection identifiers from the serving base station to use for these wireless communications. As the mobile communication device moves to the target base station, the mobile device receives new connection identifiers to use for the wireless communications. In some scenarios, the mobile communication device receives new connection identifiers even when it moves to a new sector on the same base station.

OVERVIEW

A wireless communication system has a plurality of sectors. The wireless communication system allocates connection identifiers into at least a first group of the connection identifiers and a second group of the connection identifiers. The wireless communication system associates a set of the sectors with a reservation zone. The wireless communication system associates the reservation zone with the first group of the connection identifiers. The wireless communication system associates the first group of the connection identifiers with a quality-of-service level. In response to a first service request from a first user, the wireless communication system determines that the first user has the quality-of-service level, and in response, reserves one of the connection identifiers in the first group for the first user. The wireless communication system uses the reserved one of the connection identifiers in the first group to communicate with the first user in all of the sectors associated with the reservation zone. In response to a second service request from a second user, the wireless communication system determines that the second user does not have the quality-of-service level. In response, the wireless communication system uses different ones of the connection identifiers in the second group to communicate with the second user in each one of the sectors.

A wireless communication system has a plurality of base stations. The wireless communication system allocates connection identifiers into at least a first group of the connection identifiers and a second group of the connection identifiers. The wireless communication system associates a set of the base stations with a reservation zone. The wireless communication system associates the reservation zone with the first group of the connection identifiers. The wireless communication system associates the first group of the connection identifiers with a quality-of-service level. In response to a first service request from a first user, the wireless communication system determines that the first user has the quality-of-service level, and in response, reserves one of the connection identifiers in the first group for the first user. The wireless communication system uses the reserved one of the connection identifiers in the first group to communicate with the first user from all of the base stations associated with the reservation zone. In response to a second service request from a second user, the wireless communication system determines that the second user does not have the quality-of-service level. In response, the wireless communication system uses different ones of the connection identifiers in the second group to communicate with the second user from each one of the base stations.

In some examples, the wireless communication system transfers the reserved one of the connection identifiers in the first group to the first user for use throughout the reservation zone. The wireless communication system transfers the different ones of the connection identifiers in the second group to the second user as the second user moves between the sectors or base stations associated with the reservation zone.

In some examples, the connection identifiers comprise worldwide interoperability for microwave access unicast connection identifiers. In some examples, the connection identifiers comprise worldwide interoperability for microwave access service flow identifiers.

In some examples, the wireless communication system determines that the first group of the connection identifiers has a surplus and that the second group of the connection identifiers has a shortage, and in response, re-allocates at least one of the connection identifiers in the first group to the second group. In some examples, the wireless communication system determines that the second group of the connection identifiers has a surplus and that the first group of the connection identifiers has a shortage, and in response, re-allocates at least one of the connection identifiers in the second group to the first group.

In some examples, the set of sectors or base stations associated with the reservation zone include all of the sectors or base stations served by an access service network gateway in a worldwide interoperability for microwave access system. In some examples, the set of sectors or base stations associated with the reservation zone include the current sector or base station used by the first user and all of the sectors or base stations that are adjacent to the current sector or base station. In some examples, the set of sectors or base stations associated with the reservation zone include all of the sectors or base stations in a national network.

In some examples, the wireless communication system transfers the reserved one of the connection identifiers to the first user. The wireless communication system receives communications that include the reserved one of the connection identifiers from the first user, and provides the quality of service level to the first user in response to the reserved one of the connection identifiers being in the received communications.

DETAILED DESCRIPTION

Figure 1:
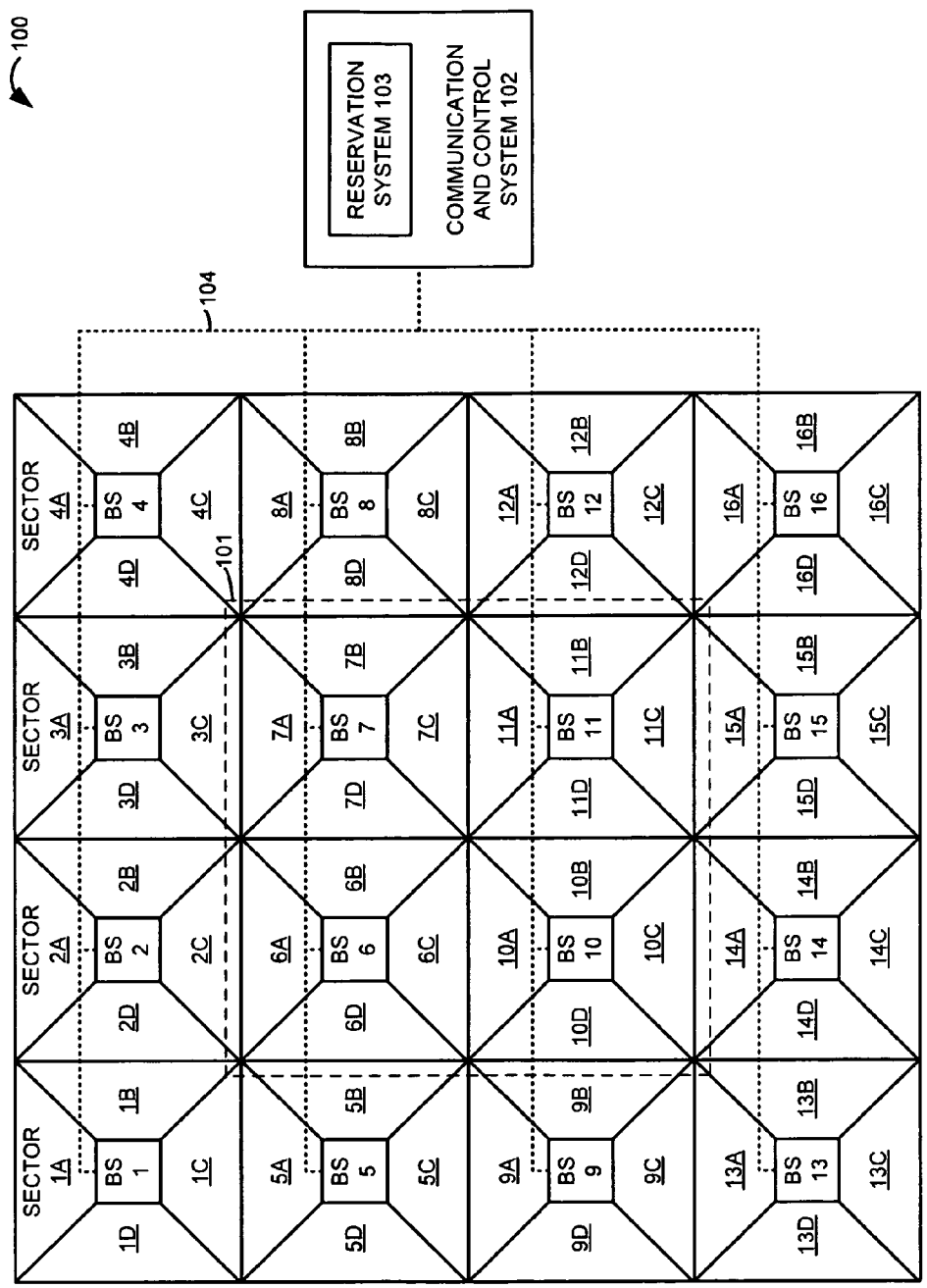
FIG. 1 is illustrates a wireless communication system.

FIG. 1 is illustrates wireless communication system 100. Wireless communication system 100 includes base stations 1-16, communication and control system 102, and communication links 104. Communication and control system 102 includes reservation system 103. Each of the base stations has corresponding sectors A, B, C, and D. For example, base station 4 has corresponding sectors 4A, 4B, 4C, and 4D. Note that FIG. 1 is provided to teach innovative principles, and in practice, the number and shape of the sectors would typically vary from that shown on FIG. 1.

Base stations 1-16 comprise antennas, transceivers, amplifiers, filters, routers, servers or some other communication components—including combinations thereof. Base stations 1-16 communicate over wireless links with multiple wireless communication devices that are operated by users. These wireless communication devices comprise telephones, transceivers, computers, digital assistants, Internet access device, or some other wireless communication apparatus—including combinations thereof. Base stations 1-16 also communicate with communication and control system 102 over communication links 104. Communication and control system 102 communicates with other networks, such as telephone networks, data networks, the Internet, servers, or some other communication system.

As the users move around, they may change the base station that they use to access their wireless communication service. For example, if a user is in sector 3C, they would communicate through base station 3. If the user moves to sector 3D, they would continue to communicate through base station 3. If the user moves to sector 7A, then they would communicate through base station 7. Thus, the users may communicate with other networks, such as the Internet, as they move around wireless communication system 100.

The wireless communication links between the user communication devices and base stations 1-16 use the air or space as the transport media. These wireless communication links may use various protocols, such as wireless fidelity, code division multiple access, global system for mobile communications, worldwide interoperability for microwave access, long term evolution, internet, telephony, or some other communication format—including combinations thereof. Communication links 104 use metal, glass, air, space, or some other material as the transport media. Communication links 104 could use various protocols, such as wireless fidelity, code division multiple access, global system for mobile communications worldwide interoperability for microwave access, internet, Ethernet, telephony, time division multiplex, or some other communication format—including combinations thereof. Communication links 104 may be direct links or may include various intermediate communication nodes, systems, or networks.

Communication and control system 102 comprises network gateways, switching centers, packet routers, computer systems, communication links, or some other type of communication equipment—including combinations thereof. Reservation system 103 comprises a computer system. Reservation system 103 may be a discreet system or may be integrated within other systems—including base stations 1-16. Reservation system 103 may reside in a single device or may be distributed across multiple devices.

Connection identifiers are used to facilitate wireless communications between base stations 1-16 and user communication devices. Wireless communication system 100 assigns connection identifiers to individual users and uses the assigned connection identifiers to route communications to and from the individual users. For example, wireless communication system 100 may stamp packets intended for a user with the connection identifier assigned to the user, and then route the packets to the user based on the connection identifier in the packets. A user may be assigned and use multiple connection identifiers at the same time. In some examples, the connection identifiers could be worldwide interoperability for microwave access unicast connection identifiers or service flow identifiers. In other examples, the connection identifiers could be MAC addresses, internet protocol addresses, Ethernet addresses, routing codes, or some other connection-related data.

As shown on FIG. 1, base stations 6, 7, 10, and 11 and their associated sectors form reservation zone 101. For users with a given quality-of-service level, reservation system 103 reserves connection identifiers for individual users for use throughout reservation zone 101. Thus, a user with the given quality-of-service level can use the same connection identifier as they move through the various sectors in the reservation zone. In contrast, users without the given quality-of-service level would need to get new connection identifiers when they change sectors and/or base stations. Advantageously, users with reserved connection identifiers do not experience the latency and processing load that are required to continuously obtain new connection identifiers as they move about. In some scenarios, the presence of the reserved connection identifiers in the user communications triggers the application of the quality-of-service level for the user.

Reservation zone 101 has four adjacent base stations their associated sectors, but a reservation zone could have other configurations. A reservation zone could have all of the sectors or base stations served by an access service network gateway in a worldwide interoperability for microwave access system. A reservation zone could have all of the sectors or base stations in a national network. A reservation zone could have all of the sectors are adjacent to the current sector occupied by the user. A reservation zone could have all of the base stations that are adjacent to the current base station communicating with the user.

Figure 2:
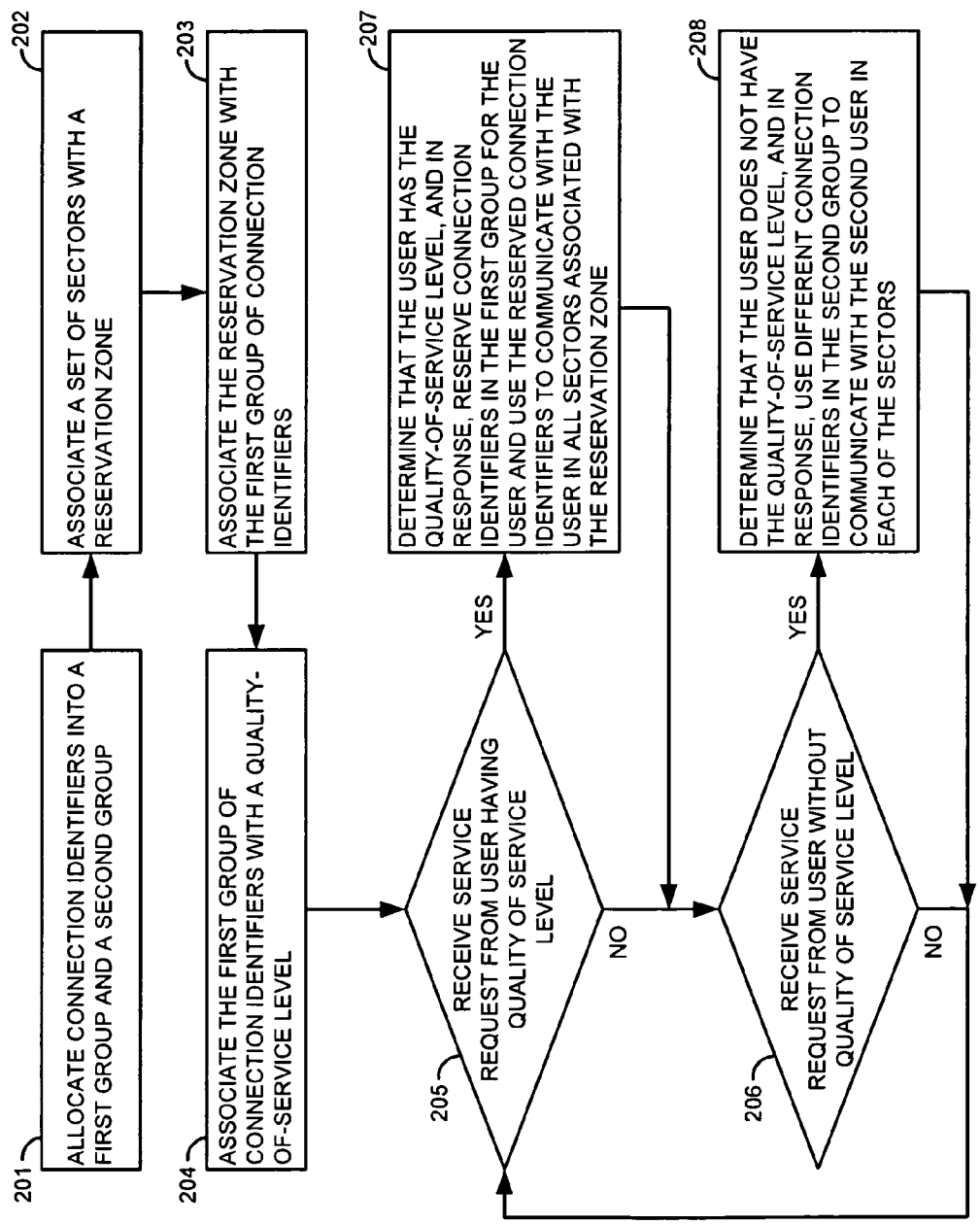
FIG. 2 illustrates the operation of the wireless communication system.

FIG. 2 illustrates the operation of wireless communication system 100. Connection identifiers are allocated into a first group and a second group (201). A set of sectors 6A-6D, 7A-7D, 10A-10D, and 11A-11D is associated with reservation zone 101 (202). Reservation zone 101 is associated with the first group of connection identifiers (203). The first group of connection identifiers is associated with a quality-of-service level (204).

Wireless communication system 100 awaits service requests from users. The service requests could be user logins, user registrations, application launches, or some other request for communication service. If a service request is received from a user with the quality-of-service level (205), wireless communication system 100 determines that the user has the quality-of-service level, and in response to the determination, system 100 reserves connection identifiers in the first group for the user (207). Wireless communication system 100 uses the reserved connection identifiers to communicate with the user in all sectors 6A-6D, 7A-7D, 10A-10D, and 11A-11D in reservation zone 101 (207). While reserved for the user, the reserved connection identifiers cannot be used in reservation zone 101 by other users, although another user may use the connection identifiers after the reservation is released.

If a service request is received from a user without the quality-of-service level (206), wireless communication system 100 determines that the user does not have the quality-of-service level, and in response to the determination, system 100 uses different connection identifiers in the second group to communicate with the user in each sector (208). Thus, this user would need to get new connection identifiers from system 100 each time they move into a new sector.

Figure 3:
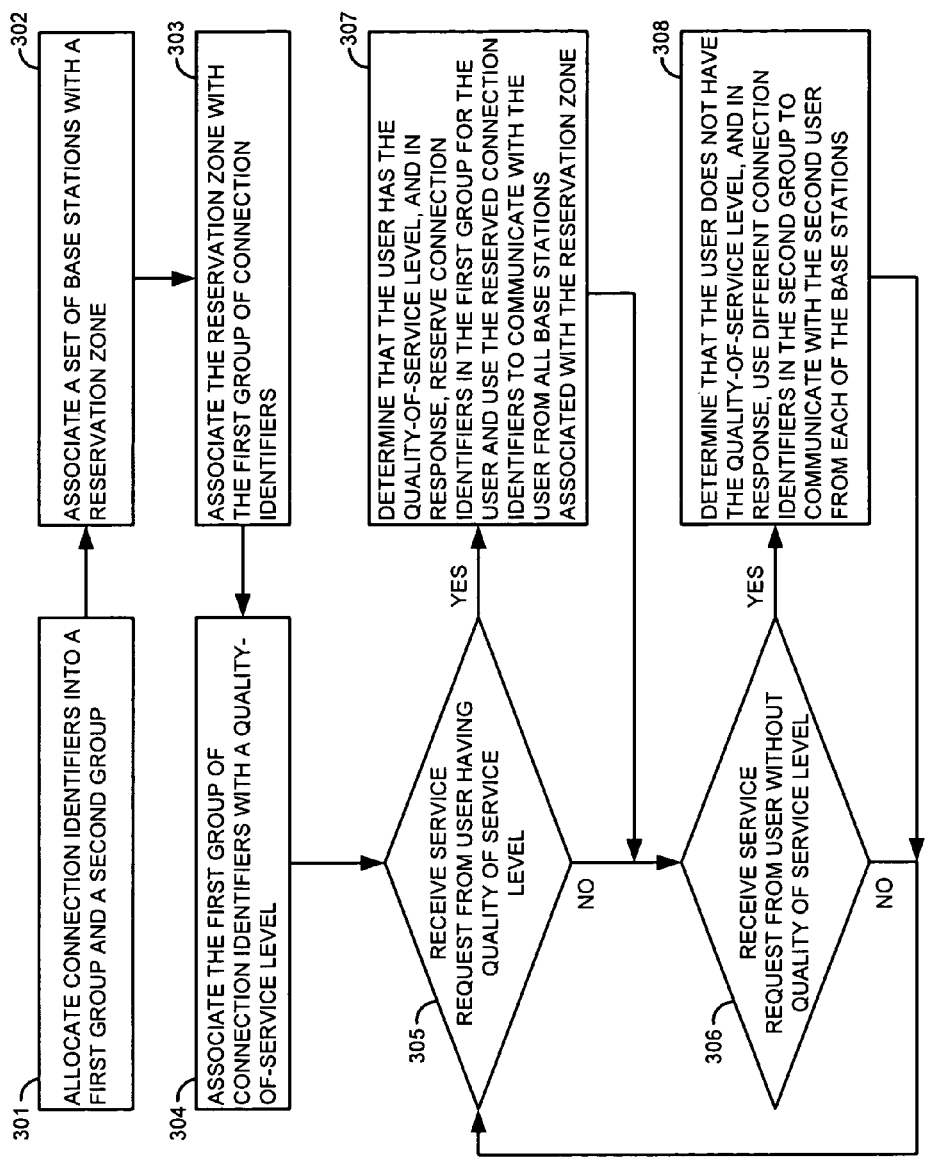
FIG. 3 illustrates an alternative operation of the wireless communication system.

FIG. 3 illustrates an alternative operation of wireless communication system 100. Connection identifiers are allocated into a first group and a second group (301). A set of sectors 6A-6D, 7A-7D, 10A-10D, and 11A-11D is associated with reservation zone 101 (302). Reservation zone 101 is associated with the first group of connection identifiers (303). The first group of connection identifiers is associated with a quality-of-service level (304).

Wireless communication system 100 awaits service requests from users. The service requests could be user logins, user registrations, application launches, or some other request for communication service. If a service request is received from a user with the quality-of-service level (305), wireless communication system 100 determines that the user has the quality-of-service level, and in response to the determination, system 100 reserves connection identifiers in the first group for the user (307). Wireless communication system 100 uses the reserved connection identifiers to communicate with the user from all base stations 6, 7, 10, and 11 in reservation zone 101 (307). While reserved for the user, the reserved connection identifiers cannot be used in reservation zone 101 by other users, although another user may use the connection identifiers after the reservation is released.

If a service request is received from a user without the quality-of-service level (306), wireless communication system 100 determines that the user does not have the quality-of-service level, and in response to the determination, system 100 uses different connection identifiers in the second group to communicate with the user from each base station (308). Thus, this user would need to get new connection identifiers from system 100 each time they communicate with a new base station.

Figure 4:
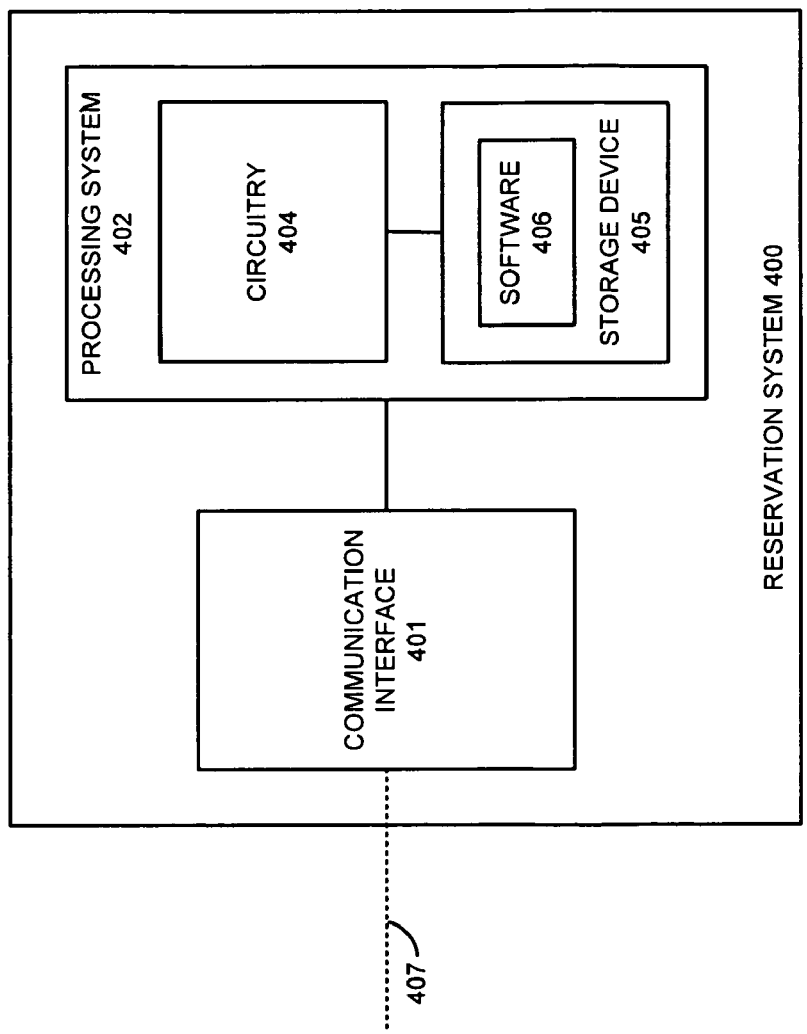
FIG. 4 illustrates a reservation system.

FIG. 4 illustrates reservation system 400. Reservation system 400 provides on example of reservation system 103, although system 103 may use other configurations. Reservation system 400 comprises communication interface 401 and processing system 402. Processing system 402 is linked to communication interface 401. Processing system 402 includes circuitry 404 and storage device 405 that stores operating software 406.

Communication interface 401 comprises components that transmit and receive communication signals over communication link 407 under the control of processing system 402. These components include transceiver and signal processing circuitry. The received communication signals include requests for connection identifiers for specific users. The transmitted communication signals identify the connection identifier assignments for the specific users.

Circuitry 404 comprises microprocessor and associated circuitry that retrieves and executes operating software 406 from storage device 405. Storage device 405 comprises a disk drive, flash drive, memory circuitry, or some other memory device. Operating software 406 comprises computer programs, firmware, or some other form of machine-readable processing instructions. Although storage device 405 is shown within reservation system 400, a portion of storage device 405 could be externally located. For example, storage device 405 may comprise an external memory apparatus that stores software 406 for subsequent transfer to an internal disk drive within reservation system 400.

When executed by circuitry 404, operating software 406 directs processing system 402 to operate reservation system 400 as described herein. In particular, operating software 406 directs processing system 402 to reserve connection identifiers for users having a given quality-of-service level. Thus, processing system 402 processes connection identifier requests for specific users to provide connection identifier assignments for the specific users.

Figure 5:
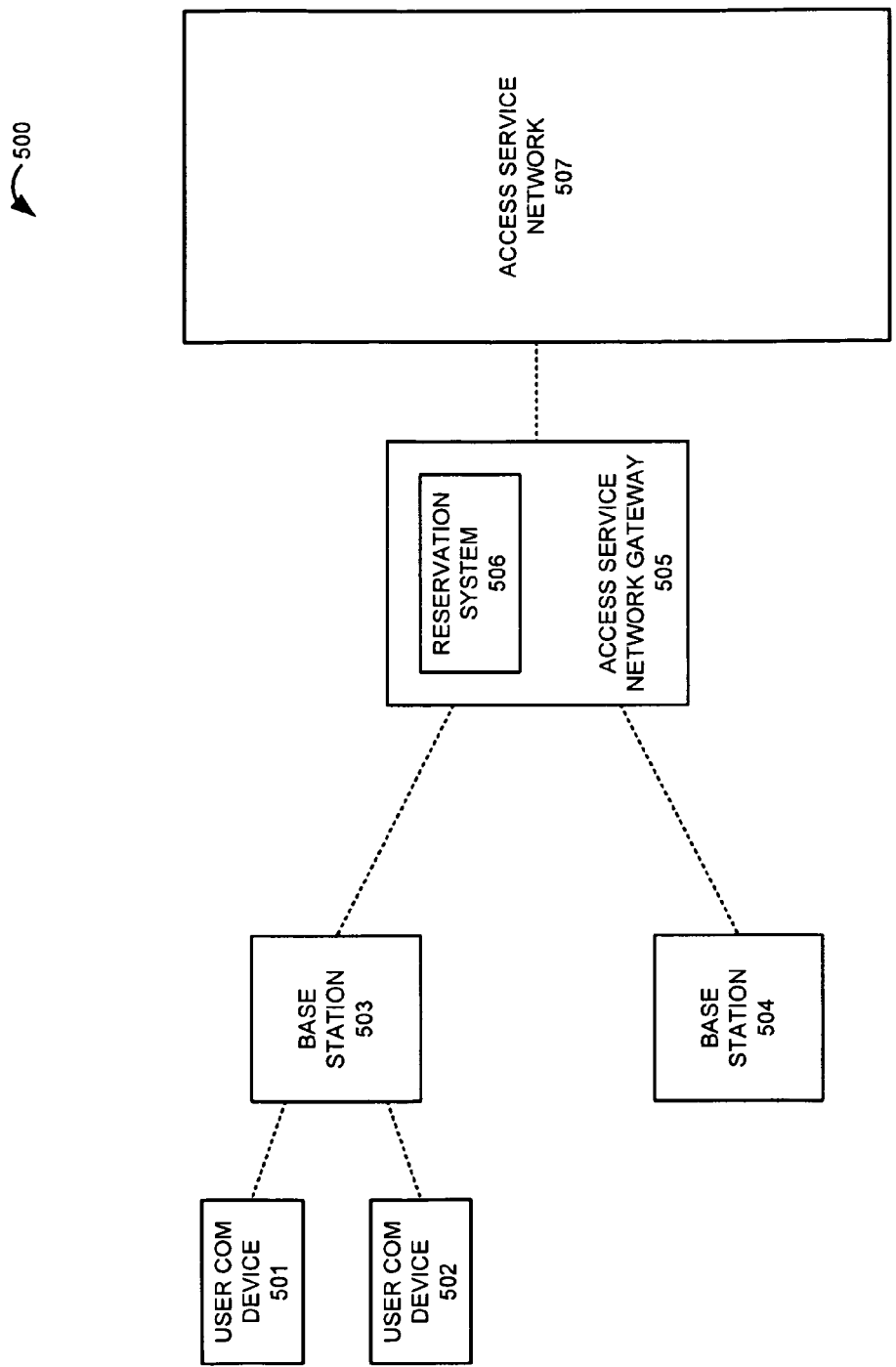
FIG. 5 illustrates a worldwide interoperability for microwave access system.
Figure 6:
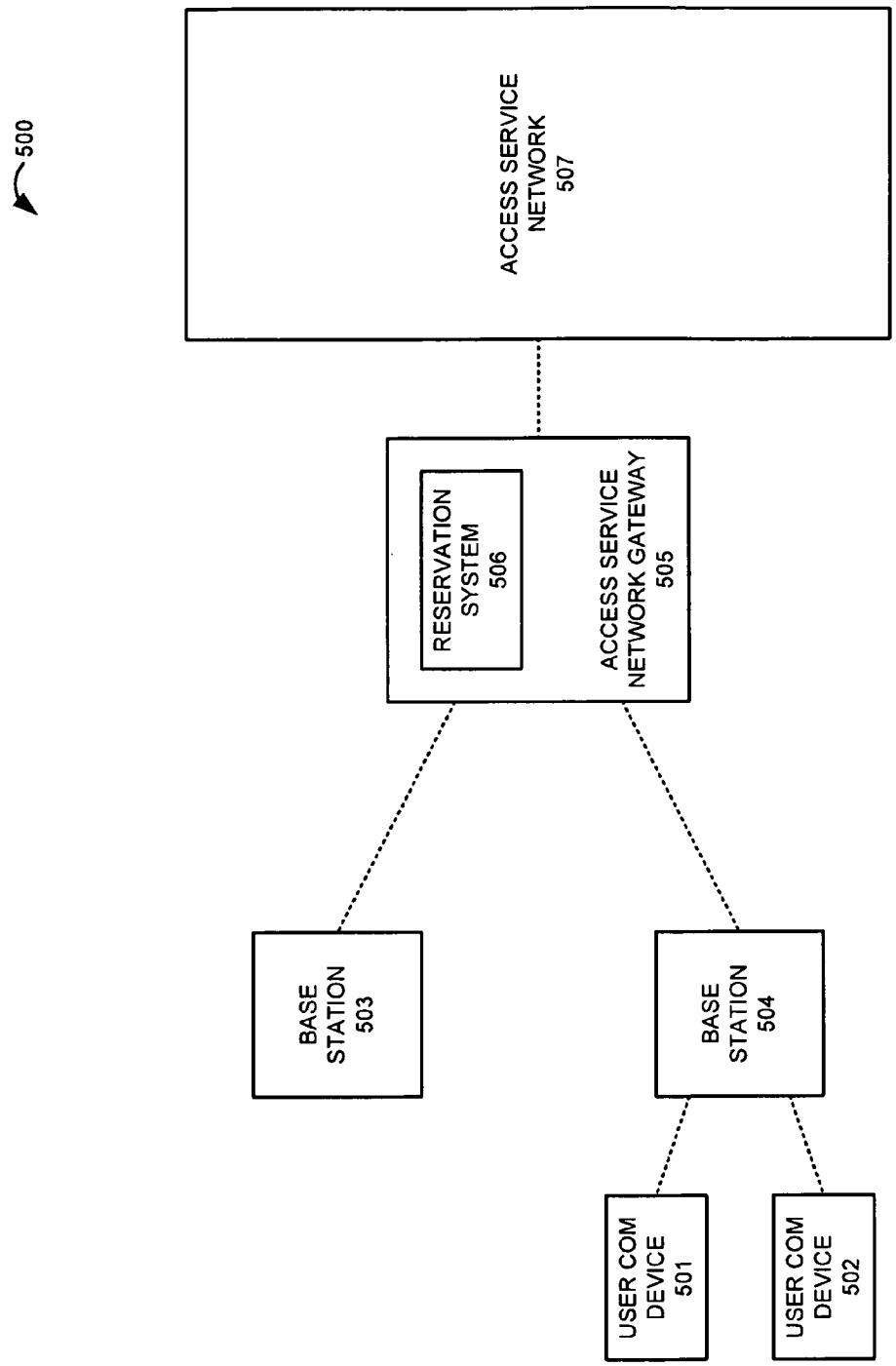
FIG. 6 illustrates a worldwide interoperability for microwave access system.

FIGS. 5-6 illustrate wireless communication system 500 at different time periods. Wireless communication system 500 comprises user communication devices 501-502, base stations 503-504, access service network gateway 505, and access service network 507. Access service network gateway 505 includes reservation system 506. Wireless communication system 500 comprises a worldwide interoperability for microwave access system.

In the first time period (FIG. 5), user communication devices 501-502 communicate through base station 503. User communication device 501 transfers a service request to access service network gateway 505 through base station 503. Gateway 505 processes the service request to determine that communication device 501 has a premium quality-of-service level. In response to this determination, gateway 505 requests premium connection identifiers from reservation system 506. Reservation system 506 reserves a set of premium connection identifiers for communication device 501 and responds to gateway 505 with the reserved connection identifiers. Gateway 505 transfers the reserved connection identifiers to user communication device 501 through base station 503. User communication device 501 transfers packets including one of the reserved connection identifiers to access service network 507 through base station 503 and gateway 505. In response to the packets having the reserved connection identifier, base station 503 and gateway 505 apply the premium quality-of-service to the packets. The premium quality-of-service may entail less delay, higher bandwidth, or some other preferred communication metric. In addition, gateway 505 receives communications from access service network 507 for user communication device 501. Gateway 505 transfers the communications in packets having another one of the reserved connection identifiers to user communication device 501 through base station 503. In response to the packets having the other reserved connection identifier, base station 503 and gateway 505 apply the premium quality-of-service to the packets.

Also in the first time period (FIG. 5), user communication device 502 transfers a service request to access service network gateway 505 through base station 503. Gateway 505 processes the service request to determine that communication device 502 does not have the premium quality-of-service level. In response to this determination, gateway 505 requests non-premium connection identifiers from reservation system 506. Reservation system 506 selects a set of non-reserved connection identifiers for communication device 502 and responds to gateway 505 with the non-reserved connection identifiers. Gateway 505 transfers the non-reserved connection identifiers to user communication device 502 through base station 503. User communication device 502 transfers packets including one of the non-reserved connection identifiers to access service network 507 through base station 503 and gateway 505. In response to the packets having the non-reserved connection identifier, base station 503 and gateway 505 do not apply the premium quality-of-service to the packets. In addition, gateway 505 receives communications from access service network 507 for user communication device 502. Gateway 505 transfers the communications in packets having another one of the non-reserved connection identifiers to user communication device 502 through base station 503. In response to the packets having the other non-reserved connection identifier, base station 503 and gateway 505 do not apply the premium quality-of-service to the packets.

In the second time period (FIG. 6), user communication devices 501-502 have moved and now communicate through base station 504. User communication device 501 may continue to use its reserved connection identifiers. Thus, user communication device 501 transfers packets including one of the reserved connection identifiers to access service network 507 through base station 504 and gateway 505. In response to the packets having the reserved connection identifier, base station 504 and gateway 505 apply the premium quality-of-service to the packets. In addition, gateway 505 receives communications from access service network 507 for user communication device 501. Gateway 505 transfers the communications in packets having another one of the reserved connection identifiers to user communication device 501 through base station 504. In response to the packets having the other reserved connection identifier, base station 504 and gateway 505 apply the premium quality-of-service to the packets.

Also in the second time period (FIG. 6), user communication device 502 must obtain new connection identifiers from system 500, because device 502 has moved to new base station 504 and because device 502 was using non-reserved connection identifiers. To facilitate the move to the new base station 504, gateway 505 requests new non-premium connection identifiers from reservation system 506. Reservation system 506 selects a set of non-reserved connection identifiers for communication device 502 and responds to gateway 505 with the new non-reserved connection identifiers. Gateway 505 transfers the new non-reserved connection identifiers to user communication device 502 through base station 504. User communication device 502 transfers packets including one of the non-reserved connection identifiers to access service network 507 through base station 504 and gateway 505. In response to the packets having the non-reserved connection identifier, base station 504 and gateway 505 do not apply the premium quality-of-service to the packets. In addition, gateway 505 receives communications from access service network 507 for user communication device 502. Gateway 505 transfers the communications in packets having another one of the non-reserved connection identifiers to user communication device 502 through base station 504. In response to the packets having the other non-reserved connection identifier, base station 504 and gateway 505 do not apply the premium quality-of-service to the packets.

During either time period, reservation system 506 may determine that there is a shortage of reserved connection identifiers and a surplus of non-reserved connection identifiers. In response, reservation system 506 re-allocates some of the surplus non-reserved connection identifiers to the pool of reserved connection identifiers. Reservation system 506 also transfers instructions causing wireless communication system 500 to apply the premium quality-of-service level to packets having one of the re-allocated reserved connection identifiers.

Likewise, reservation system 506 may determine that there is a shortage of non-reserved connection identifiers and a surplus of reserved connection identifiers. In response, reservation system 506 re-allocates some of the surplus reserved connection identifiers to the pool of non-reserved connection identifiers. Reservation system 506 also transfers instructions causing wireless communication system 500 not to apply the premium quality-of-service level to packets having one of the re-allocated non-reserved connection identifiers.

Figure 7:
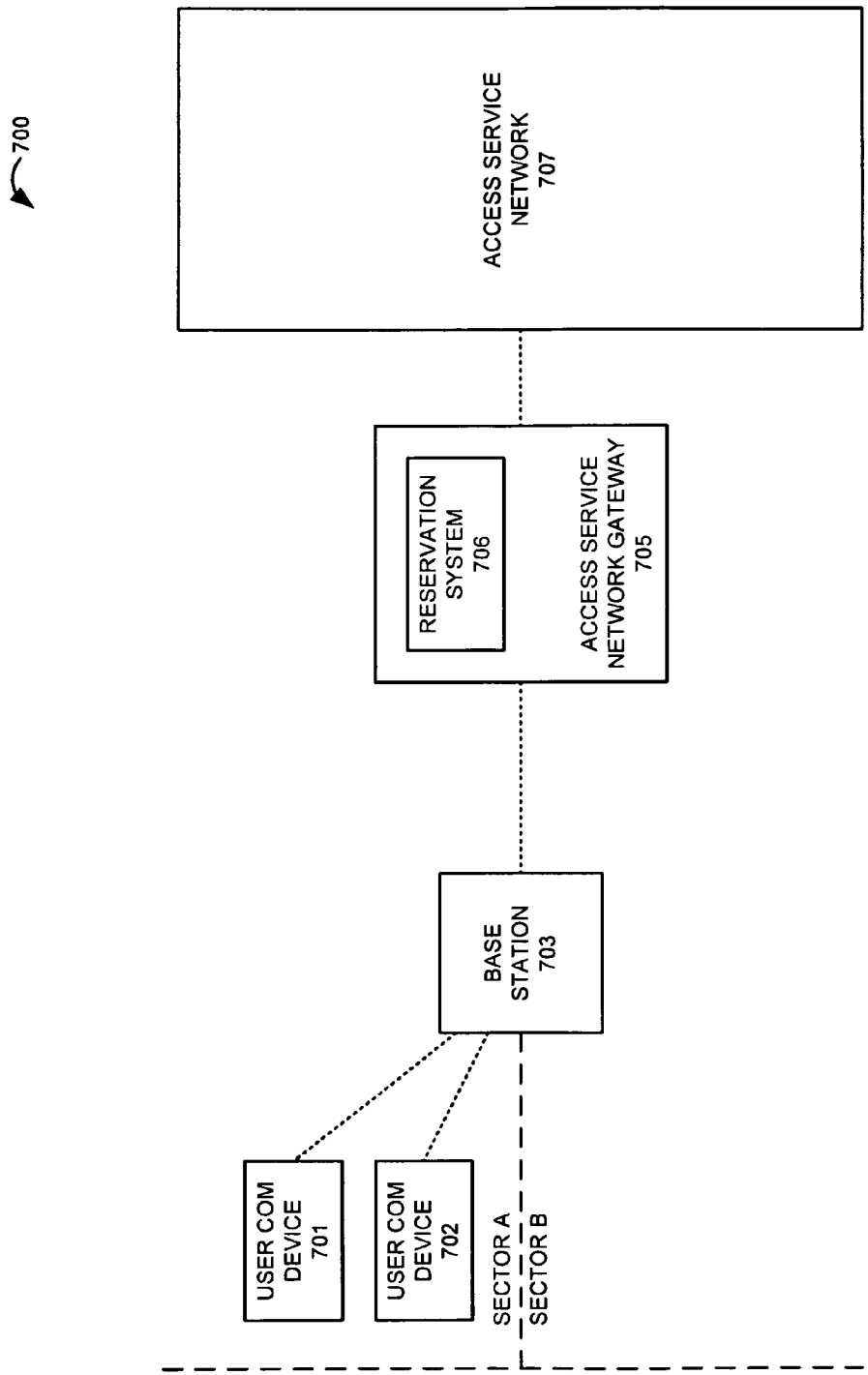
FIG. 7 illustrates a worldwide interoperability for microwave access system.
Figure 8:
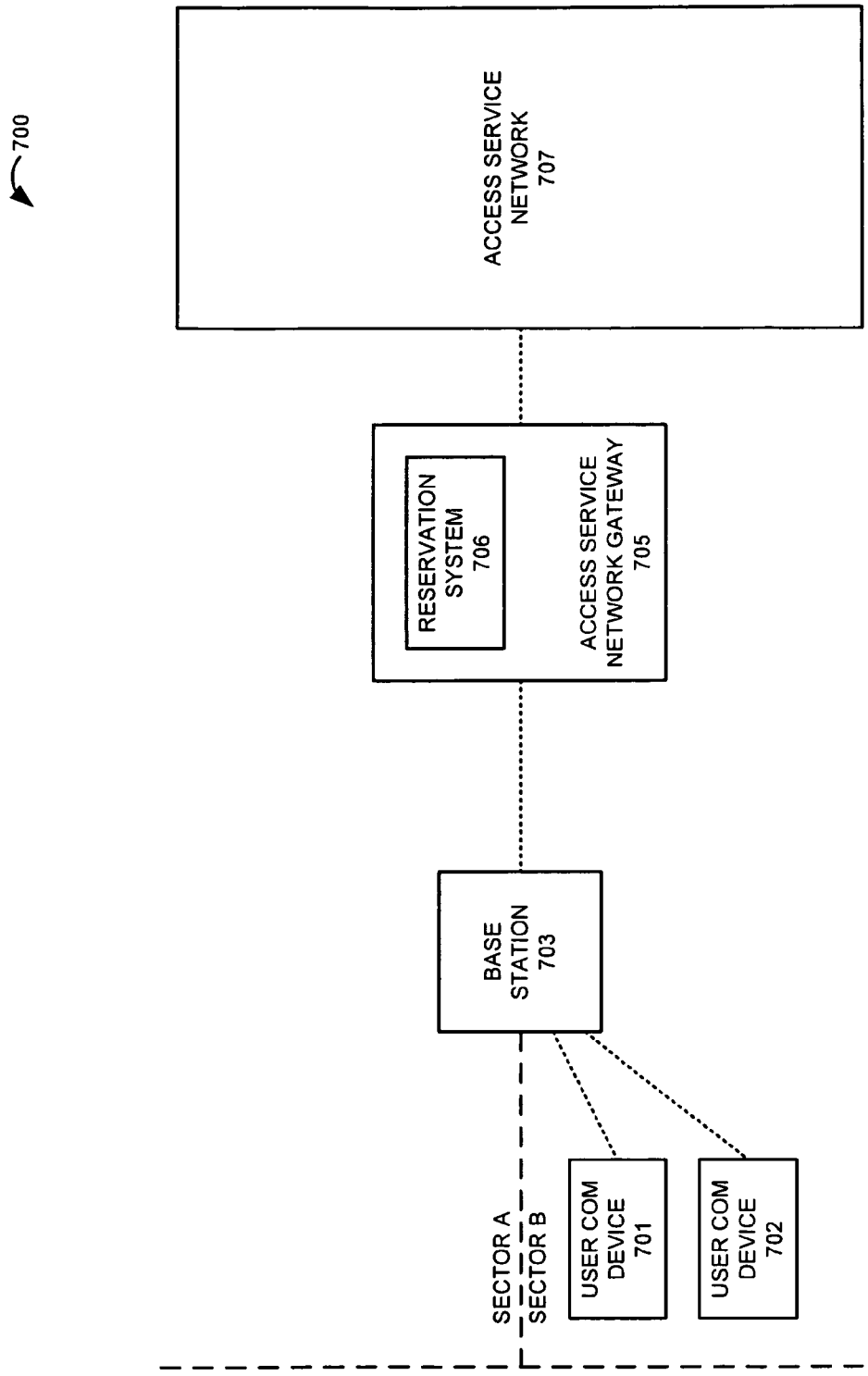
FIG. 8 illustrates a worldwide interoperability for microwave access system.

FIGS. 7-8 illustrate wireless communication system 700 at different time periods. Wireless communication system 700 comprises user communication devices 701-702, base station 703, access service network gateway 705, and access service network 707. Access service network gateway 705 includes reservation system 706. Wireless communication system 700 comprises a worldwide interoperability for microwave access system.

In the first time period (FIG. 7), user communication devices 701-702 are located in sector A of base station 703. User communication device 701 transfers a service request to access service network gateway 705 through base station 703. Gateway 705 processes the service request to determine that communication device 701 has a premium quality-of-service level. In response to this determination, gateway 705 requests premium connection identifiers from reservation system 706. Reservation system 706 reserves a set of premium connection identifiers for communication device 701 and responds to gateway 705 with the reserved connection identifiers. Gateway 705 transfers the reserved connection identifiers to user communication device 701 through base station 703. User communication device 701 transfers packets including one of the reserved connection identifiers to access service network 707 through base station 703 and gateway 705. In response to the packets having the reserved connection identifier, base station 703 and gateway 705 apply the premium quality-of-service to the packets. The premium quality-of-service may entail less delay, higher bandwidth, or some other preferred communication metric. In addition, gateway 705 receives communications from access service network 707 for user communication device 701. Gateway 705 transfers the communications in packets having another one of the reserved connection identifiers to user communication device 701 through base station 703. In response to the packets having the reserved connection identifier, base station 703 and gateway 705 apply the premium quality-of-service to the packets.

Also in the first time period (FIG. 7), user communication device 702 transfers a service request to access service network gateway 705 through base station 703. Gateway 705 processes the service request to determine that communication device 702 does not have the premium quality-of-service level. In response to this determination, gateway 705 requests non-premium connection identifiers from reservation system 706. Reservation system 706 selects a set of non-reserved connection identifiers for communication device 702 and responds to gateway 705 with the non-reserved connection identifiers. Gateway 705 transfers the non-reserved connection identifiers to user communication device 702 through base station 703. User communication device 702 transfers packets including one of the non-reserved connection identifiers to access service network 707 through base station 703 and gateway 705. In response to the packets having the non-reserved connection identifier, base station 703 and gateway 705 do not apply the premium quality-of-service to the packets. In addition, gateway 705 receives communications from access service network 707 for user communication device 702. Gateway 705 transfers the communications in packets having another one of the non-reserved connection identifiers to user communication device 702 through base station 703. In response to the packets having the non-reserved connection identifier, base station 703 and gateway 705 do not apply the premium quality-of-service to the packets.

In the second time period (FIG. 8), user communication devices 701-702 have moved to sector B of base station 703. User communication device 701 may continue to use its reserved connection identifiers. Thus, user communication device 701 transfers packets including one of the reserved connection identifiers to access service network 707 through base station 703 and gateway 705. In response to the packets having the reserved connection identifier, base station 703 and gateway 705 apply the premium quality-of-service to the packets. In addition, gateway 705 receives communications from access service network 707 for user communication device 701. Gateway 705 transfers the communications in packets having another one of the reserved connection identifiers to user communication device 701 through base station 703. In response to the packets having the reserved connection identifier, base station 703 and gateway 705 apply the premium quality-of-service to the packets.

Also in the second time period (FIG. 8), user communication device 702 must obtain new connection identifiers from system 700, because device 702 has moved to new sector B and because device 702 was using non-reserved connection identifiers. To facilitate the move to the new sector B, gateway 705 requests new non-premium connection identifiers from reservation system 706. Reservation system 706 selects a set of non-reserved connection identifiers for communication device 702 and responds to gateway 705 with the new non-reserved connection identifiers. Gateway 705 transfers the new non-reserved connection identifiers to user communication device 702 through base station 703. User communication device 702 transfers packets including one of the non-reserved connection identifiers to access service network 707 through base station 703 and gateway 705. In response to the packets having the non-reserved connection identifier, base station 703 and gateway 705 do not apply the premium quality-of-service to the packets. In addition, gateway 705 receives communications from access service network 707 for user communication device 702. Gateway 705 transfers the communications in packets having another one of the non-reserved connection identifiers to user communication device 702 through base station 703. In response to the packets having the non-reserved connection identifier, base station 703 and gateway 705 do not apply the premium quality-of-service to the packets.

During either time period, reservation system 706 may determine that there is a shortage of reserved connection identifiers and a surplus of non-reserved connection identifiers. In response, reservation system 706 re-allocates some of the surplus non-reserved connection identifiers to the pool of reserved connection identifiers. Reservation system 706 also transfers instructions causing wireless communication system 700 to apply the premium quality-of-service level to packets having one of the re-allocated reserved connection identifiers.

Likewise, reservation system 706 may determine that there is a shortage of non-reserved connection identifiers and a surplus of reserved connection identifiers. In response, reservation system 706 re-allocates some of the surplus reserved connection identifiers to the pool of non-reserved connection identifiers. Reservation system 706 also transfers instructions causing wireless communication system 700 not to apply the premium quality-of-service level to packets having one of the re-allocated non-reserved connection identifiers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system that has a plurality of sectors, the method comprising:
    allocating, by a reservation system, connection identifiers into at least a first group of the connection identifiers and a second group of the connection identifiers;
    associating, by the reservation system, a set of the sectors with a reservation zone, associating the reservation zone with the first group of the connection identifiers, and associating the first group of the connection identifiers with a quality-of-service level;
    in response to a first service request from a first user, determining, by the reservation system, that the first user has the quality-of-service level, and in response, reserving one of the connection identifiers in the first group for the first user and using the reserved one of the connection identifiers in the first group to communicate with the first user in all of the sectors associated with the reservation zone;
    in response to a second service request from a second user, determining, by the reservation system, that the second user does not have the quality-of-service level, and in response, using different ones of the connection identifiers in the second group to communicate with the second user in each one of the sectors.

2. The method of claim 1 further comprising:
    transferring, by the reservation system, the reserved one of the connection identifiers in the first group to the first user for use throughout the reservation zone; and
    transferring, by the reservation system, the different ones of the connection identifiers in the second group to the second user as the second user moves between the sectors associated with the reservation zone.

3. The method of claim 1 wherein the connection identifiers comprise worldwide interoperability for microwave access unicast connection identifiers.

4. The method of claim 1 wherein the connection identifiers comprise worldwide interoperability for microwave access service flow identifiers.

5. The method of claim 1 further comprising determining, by the reservation system, that the first group of the connection identifiers has a surplus and that the second group of the connection identifiers has a shortage, and in response, re-allocating at least one of the connection identifiers in the first group to the second group.

6. The method of claim 1 further comprising determining, by the reservation system, that the second group of the connection identifiers has a surplus and that the first group of the connection identifiers has a shortage, and in response, re-allocating at least one of the connection identifiers in the second group to the first group.

7. The method of claim 1 wherein the set of the sectors associated with the reservation zone include all of the sectors served by an access service network gateway in a worldwide interoperability for microwave access system.

8. The method of claim 1 wherein the set of the sectors associated with the reservation zone include the current sector occupied by the first user and all of the sectors that are adjacent to the current sector.

9. The method of claim 1 wherein the set of the sectors associated with the reservation zone include all of the sectors in a national network.

10. The method of claim 1 wherein using the reserved one of the connection identifiers in the first group to communicate with the first user comprises transferring the reserved one of the connection identifiers to the first user, receiving communications that include the reserved one of the connection identifiers from the first user, and providing the quality of service level to the first user in response to the reserved one of the connection identifiers being in the received communications.

11. A method of operating a wireless communication system that has a plurality of base stations, the method comprising:
- allocating, by a reservation system, connection identifiers into at least a first group of the connection identifiers and a second group of the connection identifiers;
- associating, by the reservation system, a set of the base stations with a reservation zone, associating the reservation zone with the first group of the connection identifiers, and associating the first group of the connection identifiers with a quality-of-service level;
- in response to a first service request from a first user, determining, by the reservation system, that the first user has the quality-of-service level, and in response, reserving one of the connection identifiers in the first group for the first user and using the reserved one of the connection identifiers in the first group to communicate with the first user from all of the base stations associated with the reservation zone;
- in response to a second service request from a second user, determining, by the reservation system, that the second user does not have the quality-of-service level, and in response, using different ones of the connection identifiers in the second group to communicate with the second user from each one of the base stations.

12. The method of claim 1 further comprising:
- transferring, by the reservation system, the reserved one of the connection identifiers in the first group to the first user for use throughout the reservation zone; and
- transferring, by the reservation system, the different ones of the connection identifiers in the second group to the second user as the second user moves between the base stations associated with the reservation zone.

13. The method of claim 1 wherein the connection identifiers comprise worldwide interoperability for microwave access unicast connection identifiers.

14. The method of claim 1 wherein the connection identifiers comprise worldwide interoperability for microwave access service flow identifiers.

15. The method of claim 1 further comprising determining, by the reservation system, that the first group of the connection identifiers has a surplus and that the second group of the connection identifiers has a shortage, and in response, re-allocating at least one of the connection identifiers in the first group to the second group.

16. The method of claim 1 further comprising determining, by the reservation system, that the second group of the connection identifiers has a surplus and that the first group of the connection identifiers has a shortage, and in response, re-allocating at least one of the connection identifiers in the second group to the first group.

17. The method of claim 1 wherein the set of the base stations associated with the reservation zone include all of the base stations served by an access service network gateway in a worldwide interoperability for microwave access system.

18. The method of claim 1 wherein the set of the base stations associated with the reservation zone include the current base station used by the first user and all of the base stations that are adjacent to the current base station.

19. The method of claim 1 wherein the set of the base stations associated with the reservation zone include all of the base stations in a national network.

20. The method of claim 1 wherein using the reserved one of the connection identifiers in the first group to communicate with the first user comprises transferring the reserved one of the connection identifiers to the first user, receiving communications that include the reserved one of the connection identifiers from the first user, and providing the quality of service level to the first user in response to the reserved one of the connection identifiers being in the received communications.

* * * * *